US012665113B2

(12) United States Patent
Otsubo

(10) Patent No.: US 12,665,113 B2
(45) Date of Patent: Jun. 23, 2026

(54) INDUCTOR

(71) Applicant: Panasonic Intellectual Property Management Co., Ltd., Osaka (JP)

(72) Inventor: Mutsuyasu Otsubo, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 687 days.

(21) Appl. No.: 18/252,470

(22) PCT Filed: Oct. 15, 2021

(86) PCT No.: PCT/JP2021/038274
§ 371 (c)(1),
(2) Date: May 10, 2023

(87) PCT Pub. No.: WO2022/113561
PCT Pub. Date: Jun. 2, 2022

(65) Prior Publication Data
US 2024/0021350 A1 Jan. 18, 2024

(30) Foreign Application Priority Data
Nov. 27, 2020 (JP) ................................ 2020-197411

(51) Int. Cl.
*H01F 5/04* (2006.01)
*H01F 27/29* (2006.01)
*H01F 27/32* (2006.01)

(52) U.S. Cl.
CPC ............... *H01F 5/04* (2013.01); *H01F 27/29* (2013.01); *H01F 27/324* (2013.01)

(58) Field of Classification Search
CPC ........... H01F 5/04; H01F 27/29; H01F 27/324
See application file for complete search history.

(56) References Cited

U.S. PATENT DOCUMENTS 11,855,540 B2 * 12/2023 DeVries, Jr. ............ H01F 41/04
2008/0003864 A1 * 1/2008 Hatakeyama ......... H01F 17/045
439/399

(Continued)

FOREIGN PATENT DOCUMENTS

JP 2007273739 A * 10/2007
JP 2008-010752 A 1/2008

(Continued)

OTHER PUBLICATIONS

Japanese Patent Office, Decision to Grant a Patent (TRANSLATED) 2025 (Year: 2025).*

(Continued)

*Primary Examiner* — Malcolm Barnes
(74) *Attorney, Agent, or Firm* — Rimon P.C.

(57) ABSTRACT

An inductor includes: a magnetic core; a coil element including a coil portion and a drawn portion; an electrode member located on a side surface and a bottom surface; and a connection portion connecting the drawn portion and the electrode member. The electrode member includes a bottom plate portion located along the bottom surface, a side plate portion located along the side surface, and a first protruding plate portion connected to the side plate portion and protruding in a direction away from the side surface. The drawn portion extends along the side plate portion or the side surface. The first protruding plate portion includes an edge in contact with the drawn portion in an extending direction of the drawn portion. The connection portion includes a first connection portion in which the drawn portion and the edge of the first protruding plate portion are welded together.

15 Claims, 9 Drawing Sheets

(56) References Cited

U.S. PATENT DOCUMENTS

| | | | | |
|---|---|---|---|---|
| 2008/0310051 | A1* | 12/2008 | Yan | H01F 17/045 360/123.01 |
| 2010/0007451 | A1* | 1/2010 | Yan | H01F 17/043 336/90 |
| 2011/0006867 | A1* | 1/2011 | Oki | H01F 27/292 336/192 |
| 2011/0279211 | A1 | 11/2011 | Miura et al. | |
| 2014/0002227 | A1* | 1/2014 | Hsieh | H01F 5/003 336/200 |
| 2015/0116070 | A1* | 4/2015 | Arai | H01F 27/292 336/192 |
| 2016/0247626 | A1* | 8/2016 | Kawarai | H01F 27/2823 |
| 2017/0309392 | A1* | 10/2017 | Kobayashi | H01F 27/2823 |

FOREIGN PATENT DOCUMENTS

| | | | |
|---|---|---|---|
| JP | 2011-243685 | A | 12/2011 |
| JP | 2012-147031 | A | 8/2012 |
| JP | 2012-525009 | A | 10/2012 |
| JP | 2015-088639 | A | 5/2015 |
| JP | 2016-127189 | A | 7/2016 |
| JP | 2019140403 | A * | 8/2019 |

OTHER PUBLICATIONS

International Search Report issued on Dec. 14, 2021 in International Patent Application No. PCT/JP2021/038274 with English translation.

Japanese Office Action dated Apr. 1, 2025 issued in the corresponding Japanese Patent Application No. 2022-565107.

* cited by examiner

INDUCTOR

CROSS-REFERENCE OF RELATED APPLICATIONS

This application is the U.S. National Phase under 35 U.S.C. § 371 of International Patent Application No. PCT/JP2021/038274, filed on Oct. 15, 2021, which in turn claims the benefit of Japanese Patent Application No. 2020-197411, filed on Nov. 27, 2020, the entire disclosures of which applications are incorporated by reference herein.

TECHNICAL FIELD

The present disclosure relates to inductors.

BACKGROUND ART

Inductors, which are passive elements that store electrical energy as magnetic energy, are used in, for example, DC-DC converter devices for the purpose of stepping up/down power supply voltage and smoothing direct current. An inductor is mounted, for example, on the surface of a circuit board or the like. For example, Patent Literature (PTL) 1 discloses an inductor including a body portion containing a magnetic material, a coil element located inside the body portion, and a terminal fitting connected to the coil element. In the inductor described in PTL 1, the tip of the coil element is exposed from the body portion, and the terminal fitting is welded to the exposed tip of the coil element.

CITATION LIST

Patent Literature

PTL 1

Japanese Unexamined Patent Application Publication No. 2011-243685

SUMMARY OF INVENTION

Technical Problem

The conventional inductor may have low reliability due to low reliability of connection between the electrode member as the terminal fitting and the coil element. In view of this, the present disclosure has an object of enhancing the reliability of an inductor.

Solution to Problem

An inductor according to an aspect of the present disclosure includes: a magnetic core containing a magnetic material and including a bottom surface, a top surface, and a side surface connected to the bottom surface and the top surface; a coil element including a coil portion buried in the magnetic core and a drawn portion connected to an end of the coil portion and drawn from the side surface to outside of the magnetic core; an electrode member located on the side surface and the bottom surface; and a connection portion connecting the drawn portion and the electrode member, wherein the electrode member includes a bottom plate portion located along the bottom surface, a side plate portion connected to the bottom plate portion and located along the side surface, and a first protruding plate portion connected to the side plate portion and protruding in a direction away from the side surface, the drawn portion extends along the side plate portion or the side surface, on the outside of the magnetic core, the first protruding plate portion includes an edge at least part of which is in contact with the drawn portion in an extending direction of the drawn portion, and the connection portion includes a first connection portion in which the drawn portion and the edge of the first protruding plate portion are welded together.

Advantageous Effects of Invention

According to the present disclosure, the reliability of an inductor can be enhanced.

Figure 1:
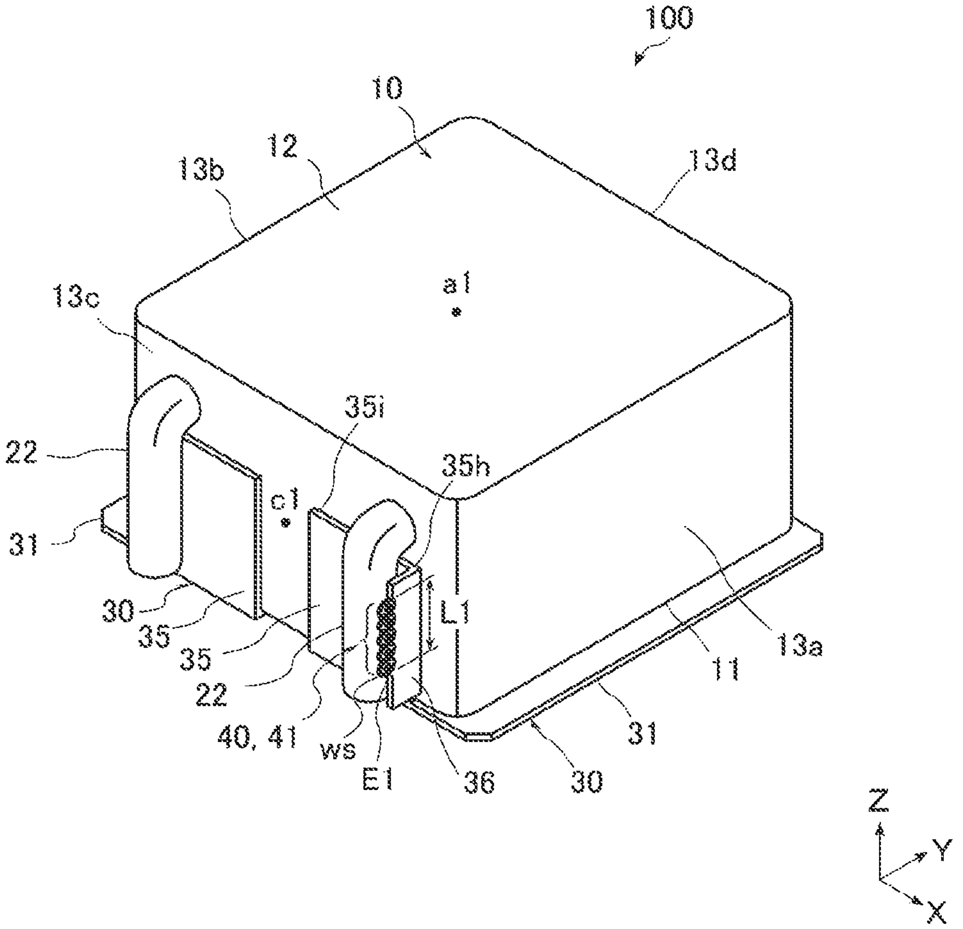
FIG. 1 is a perspective view of an inductor according to an embodiment.

DESCRIPTION OF EMBODIMENTS (Circumstances Leading to the Present Disclosure)

In the structure in which the electrode member is welded to the tip of the coil element as in PTL 1 described above, a small cross-sectional area of the connection portion that connects the coil element and the electrode member is likely to cause a decrease in the reliability of connection between the coil element and the electrode member. The structure in which the electrode member is welded to the tip of the coil element also has a problem in that, because the cross-sectional area of the current path in the weld zone cannot be increased, the DC resistance increases and the reliability of the inductor decreases. Moreover, in the case where the cross-sectional area of the current path in the weld zone cannot be increased, the temperature rises when the inductor is energized, as a result of which the reliability of the inductor decreases.

The present disclosure has the following structure for enhancing the reliability of the inductor. Embodiments will be described in detail below with reference to the drawings.

The embodiments described below each show a specific example according to the present disclosure. The numerical values, shapes, materials, structural elements, the arrangement and connection of the structural elements, steps, the order of steps, etc. shown in the following embodiments are mere examples, and do not limit the scope of the present disclosure. Of the structural elements in the embodiments described below, the structural elements not recited in any one of the independent claims are described as optional structural elements.

In this specification, the terms indicating the relationships between elements, such as "parallel", the terms indicating the shapes of elements, such as "rectangular parallelepiped", and the numerical ranges are not expressions of strict meanings only, but are expressions of meanings including substantially equivalent ranges, for example, allowing for a difference of about several percent.

Each drawing is a schematic involving emphasis, omission, or proportion adjustment as appropriate to show the present disclosure and does not necessarily provide precise depiction, and accordingly may differ from the actual shapes, positional relationships, and proportions. The substantially same elements are given the same reference signs throughout the drawings, and repeated description may be omitted or simplified.

The X-axis, the Y-axis, and the Z-axis representing three directions orthogonal to one another are given in each drawing, and these axes and the axial directions along the axes are used for explanation as necessary. The axes are given for explanation, and do not limit the direction and position in which the inductor is used.

In this specification, the terms "top surface" and "bottom surface" in the structure of the inductor do not refer to the top surface (vertically upper surface) and the bottom surface (vertically lower surface) in absolute spatial recognition, but are used as terms defined by the relative positional relationship of the structural elements of the inductor.

EMBODIMENT

[Structure]

The structure of an inductor according to an embodiment will be described below. The inductor is a passive element that stores electrical energy flowing through a coil element as magnetic energy.

Figure 2:
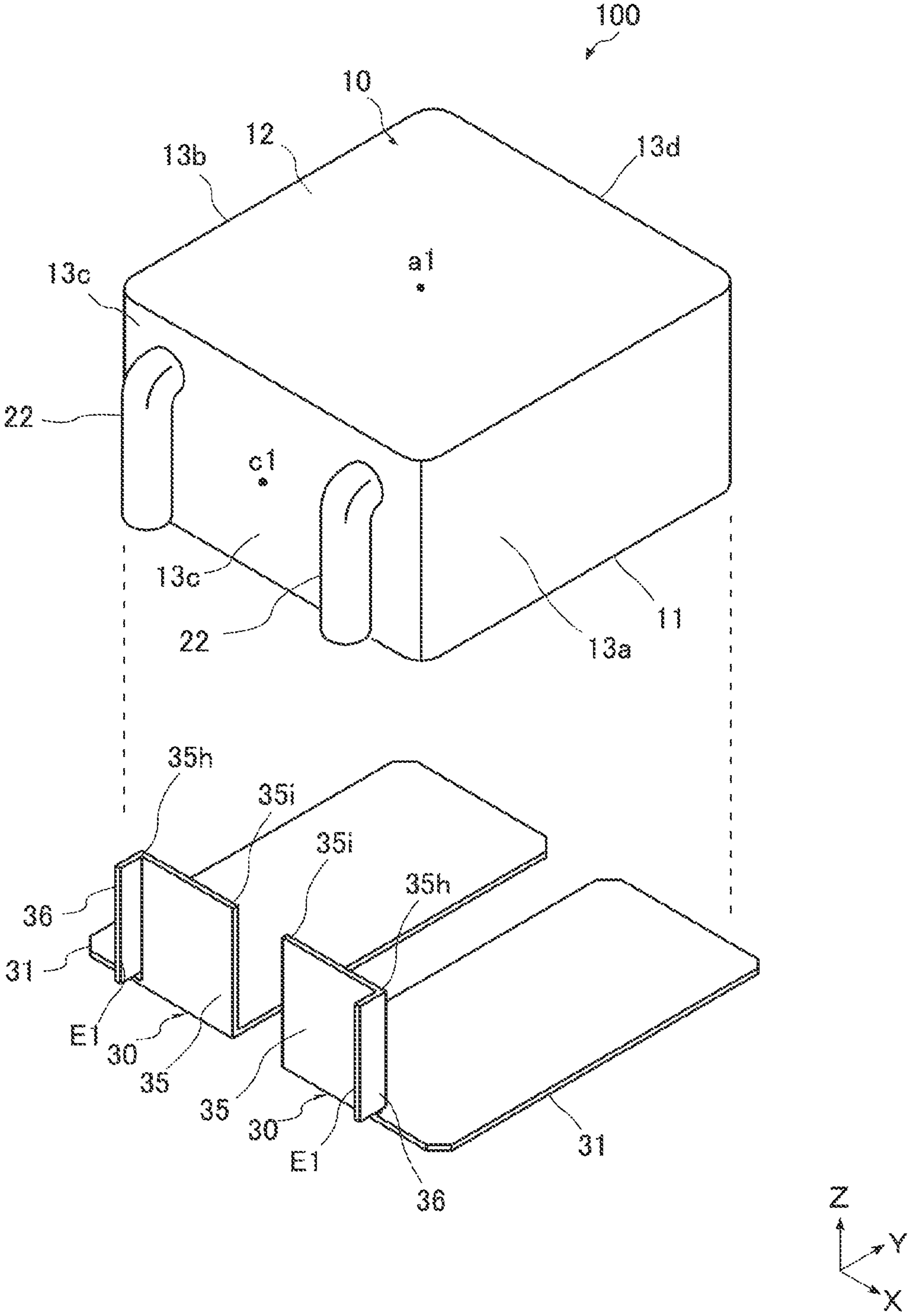
FIG. 2 is a diagram illustrating a state in which a connection portion is removed and an electrode member is separated from the inductor illustrated in FIG. 1.
Figure 3:
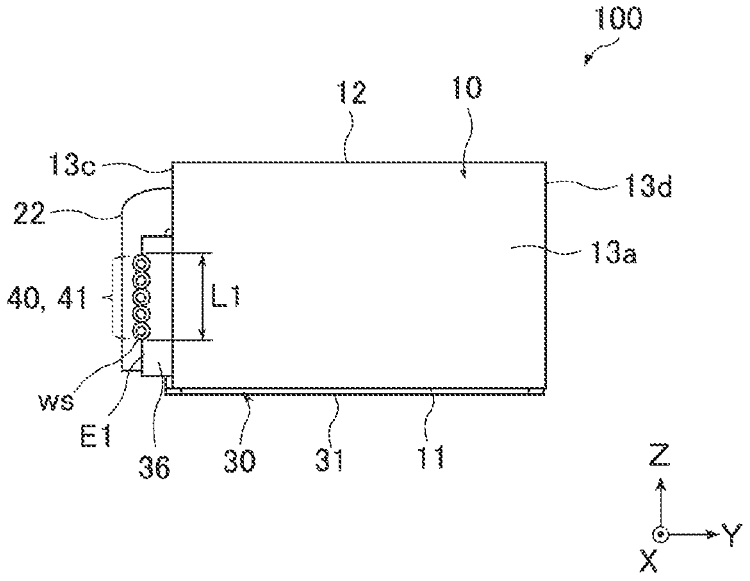
FIG. 3 is a front view of the inductor according to the embodiment.
Figure 4:
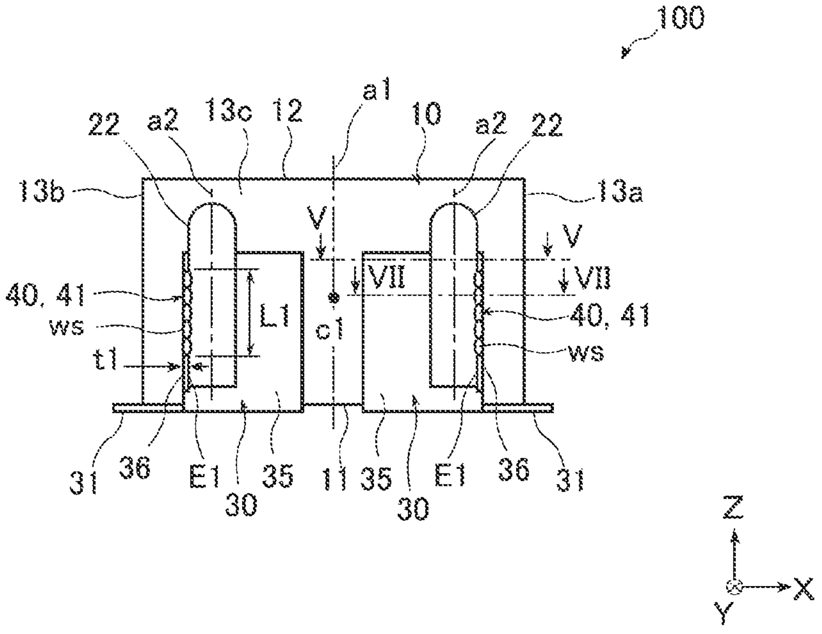
FIG. 4 is a side view of the inductor according to the embodiment.
Figure 5:
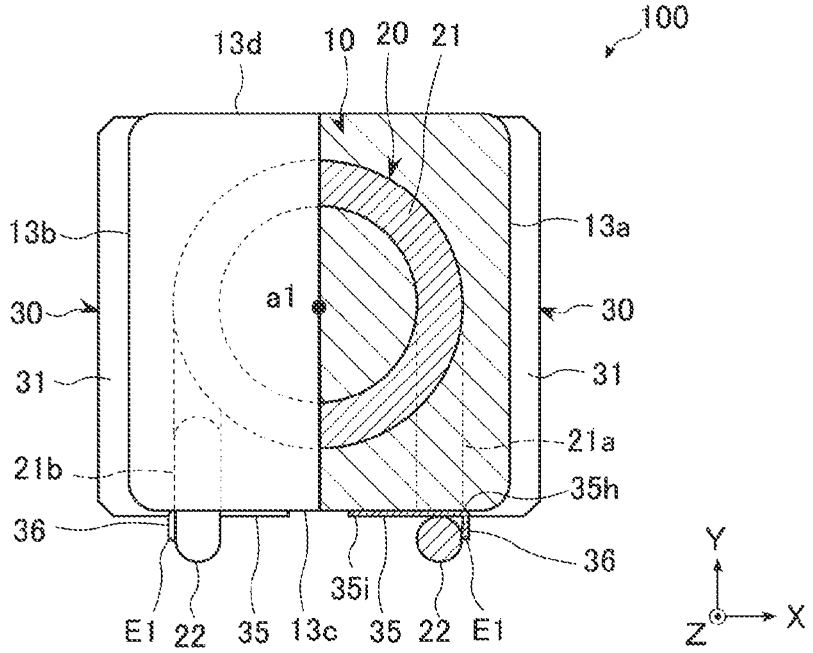
FIG. 5 is a top view of the inductor according to the embodiment.

FIG. 1 is a perspective view of inductor 100 according to an embodiment. FIG. 2 is a diagram illustrating a state in which connection portion 40 is removed and electrode member 30 is separated from inductor 100 illustrated in FIG. 1. FIG. 3 is a front view of inductor 100. FIG. 4 is a side view of inductor 100. FIG. FIG. 5 is a top view of inductor 100. In FIGS. 3 to 5, the front view is a view from the positive side to the negative side of the X-axis, the side view is a view from the negative side to the positive side of the Y-axis, and the top view is a view from the positive side to the negative side of the Z-axis. The same applies to the other drawings. FIG. 5 also includes a sectional view of inductor 100 taken along line V-V in FIG. 4. In FIG. 5, the shape of coil element 20 in a top view is indicated by solid lines or dashed lines.

As illustrated in FIGS. 1 to 5, inductor 100 includes magnetic core 10, coil element 20 including coil portion 21 and drawn portion 22, electrode member 30 as an external terminal, and connection portion 40 connecting drawn portion 22 and electrode member 30.

The following description mainly focuses on half of inductor 100 on the positive side of the X-axis. Half of inductor 100 on the negative side of the X-axis has the same structure as half of inductor 100 on the positive side of the X-axis, and the same description applies.

Inductor 100 has a shape roughly determined by the shape of magnetic core 10 which is a rectangular parallelepiped dust core, for example. Magnetic core 10 can be molded into any shape. In other words, any shape of inductor 100 can be obtained according to the shape of magnetic core 10 in molding. Magnetic core 10 in this embodiment has the dimensions of 17 mm or more in the X-axis direction, 17 mm or more in the Y-axis direction, and 7 mm or more in the Z-axis direction.

Magnetic core 10 is the outer shell of inductor 100, and covers part of coil element 20. Magnetic core 10 contains a magnetic material, and is, for example, a dust core made of a metal magnetic powder and a resin material or the like. Magnetic core 10 is not limited as long as it is formed using a magnetic material. As the magnetic material, ferrite or any other magnetic material may be used. As the metal magnetic powder, a particulate material having a predetermined elemental composition, such as Fe—Si—Al-based, Fe—Si-based, Fe—Si—Cr-based, or Fe—Si—Cr—B-based, is used. As the resin material, a material that can maintain a certain shape by binding the particles of the metal magnetic powder while insulating the particles of the metal magnetic powder from each other, such as a silicone-based resin, is selected.

Magnetic core 10 is, for example, a rectangular parallelepiped. Magnetic core 10 includes bottom surface 11, top surface 12 opposite to bottom surface 11, and four side surfaces 13*a*, 13*b*, 13*c*, and 13*d* connected to bottom surface 11 and top surface 12. Side surfaces 13*a* and 13*b* are arranged in the X-axis direction and are opposite to each other. Side surfaces 13*c* and 13*d* are arranged in the Y-axis direction and are opposite to each other. Bottom surface 11, top surface 12, and side surfaces 13*a*, 13*b*, 13*c*, and 13*d* are each a flat surface. The pair of bottom surface 11 and top surface 12, the pair of side surfaces 13*a* and 13*b*, and the pair of side surfaces 13*c* and 13*d* are each a pair of surfaces parallel to each other. Bottom surface 11 and top surface 12 extend in a direction crossing side surfaces 13*a*, 13*b*, 13*c*, and 13*d*, specifically, in a direction orthogonal to side surfaces 13*a*, 13*b*, 13*c*, and 13*d*. Side surfaces 13*a* and 13*b* extend in a direction crossing side surfaces 13*c* and 13*d*, specifically, in a direction orthogonal to side surfaces 13*c* and 13*d*.

Coil element 20 includes coil portion 21 buried in magnetic core and a plurality of drawn portions 22 exposed on the outside of magnetic core 10.

Figure 6:
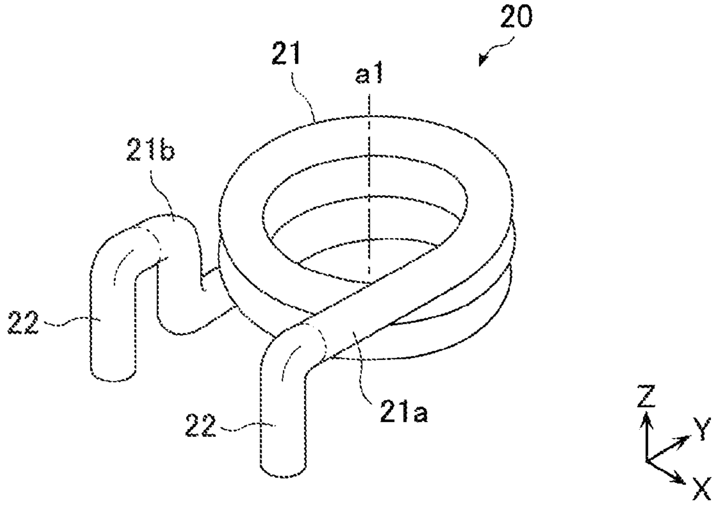
FIG. 6 is a perspective view of a coil element included in the inductor according to the embodiment.

FIG. 6 is a perspective view of coil element 20 included in inductor 100.

As illustrated in FIG. 6, coil element 20 includes one coil portion 21 and two drawn portions 22. In FIG. 6, coil portion 21 is a part on the positive side of the Y-axis from the dashed-dotted line in coil element 20, and drawn portion 22 is a part on the negative side of the Y-axis from the dashed-dotted line.

Coil element 20 is, for example, composed of a conductive wire. The conductive wire is composed of: a metal wire made of a metal material selected from metals such as aluminum, copper, silver, and gold, alloys containing one or more of these metals, materials consisting of metals or alloys and other substances, etc.; and an insulating coating covering the metal wire. Specifically, the conductive wire is a copper wire coated with an insulating coating, for example. For example, coil portion 21 and drawn portion 22 are names given to respective parts formed by working one member made of the same material.

Coil portion 21 is a part covered with magnetic core 10. Coil portion 21 is composed of a wound conductive wire, and functions as a coil. The number of turns of coil portion 21 is not limited, and is selected as appropriate according to the performance required of inductor 100 and the constraints such as the size of magnetic core 10, for example, from 0.5 turns to 10 turns. For example, the cross section of the conductive wire forming coil portion 21 is a circle with a diameter of 2 mm or more, and the aspect ratio of the cross section is 1:1. Coil portion 21 is buried in magnetic core 10 so that winding axis a1 of coil portion 21 will extend in the direction (Z-axis direction) connecting bottom surface 11 and top surface 12.

Coil portion 21 includes both ends 21*a* and 21*b* that connect the wound part to side surface 13*c* of magnetic core 10 (see FIG. 5). Of both ends 21*a* and 21*b* of coil portion 21, one end 21*a* is located on the positive side of the X-axis, i.e. to the right of winding axis a1 when viewed in the direction perpendicular to side surface 13*c*, and other end 21*b* is located on the negative side of the X-axis, i.e. to the left of winding axis a1 when viewed in the direction perpendicular to side surface 13*c*. Both ends 21*a* and 21*b* of coil portion 21 are located at a height closer to top surface 12 than center c1 of side surface 13*c* when viewed in the direction perpendicular to side surface 13*c*, and are at the same height from bottom surface 11.

As illustrated in FIG. 4, each drawn portion 22 is connected to end 21*a* or 21*b* of coil portion 21, is drawn from side surface 13*c* of magnetic core 10 to the outside, and extends along side plate portion 35 or side surface 13*c*. Specifically, drawn portion 22 is drawn to the outside from a height closer to top surface 12 than center c1 of side surface 13*c*, is bent so as to cover side plate portion 35 of electrode member 30, and extends in the direction (Z-axis direction) connecting bottom surface 11 and top surface 12 to a point before reaching the edge of bottom surface 11. Drawn portion 22 in this embodiment is drawn out from one side surface 13*c* out of the four side surfaces.

As illustrated in FIGS. 1 to 5, electrode member 30 is located on the outside of magnetic core 10 (for example, on the bottom surface 11 side and the side surface 13*c* side), and is electrically connected to drawn portion 22 via connection portion 40. Two electrode members 30 are provided for respective two drawn portions 22. Each electrode member 30 contains a conductive material, and is composed of, for example, a metal material plate. The metal material plate is made of a metal material selected from metals such as aluminum, copper, silver, and gold, alloys containing one or more of these metals, materials consisting of metals or alloys and other substances, etc.

Electrode member 30 includes bottom plate portion 31 located on the bottom surface 11 side of magnetic core 10, side plate portion 35 connected to bottom plate portion 31, and first protruding plate portion 36 connected to side plate portion 35. For example, bottom plate portion 31, side plate portion 35, and first protruding plate portion 36 are names given to respective parts formed by working one member made of the same material.

Bottom plate portion 31 is located on the bottom surface 11 side of magnetic core 10 so as to extend along bottom surface 11. Bottom plate portion 31 is fixed to magnetic core 10 via an adhesive. When mounting inductor 100 on a circuit board, bottom plate portion 31 is soldered to the circuit board.

Side plate portion 35 is connected to bottom plate portion 31, and located along side surface 13*c* of magnetic core 10. Side plate portion 35 in this embodiment extends from bottom plate portion 31 toward top surface 12, and is located between side surface 13*c* of magnetic core 10 and drawn portion 22. Side plate portion 35 includes outer end 35*h* located outward from drawn portion 22 and inner end 35*i* located inward from drawn portion 22, i.e. located on the winding axis a1 side, when viewed in the direction perpendicular to side surface 13*c* (see FIG. 2). Side plate portion 35 is provided in correspondence with one side surface 13*c* out of the four side surfaces. Side plate portion 35 may be fixed to magnetic core 10 via an adhesive.

First protruding plate portion 36 is connected to outer end 35*h* of side plate portion 35 and protrudes in a direction away from side surface 13*c* of magnetic core 10. First protruding plate portion 36 protrudes perpendicularly to side plate portion 35. First protruding plate portion 36 includes edge E1 on the side opposite to side surface 13*c* and outer end 35*h*. At least part of edge E1 is in contact with drawn portion 22 in the extending direction of drawn portion 22.

Figure 7:
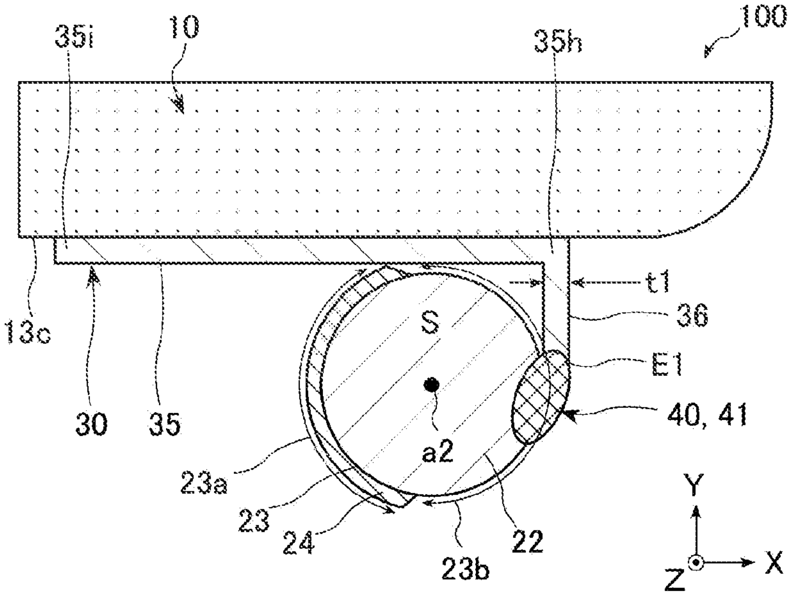
FIG. 7 is a sectional view of a drawn portion and the electrode member in the inductor according to the embodiment, taken along line VII-VII in FIG. 4.

FIG. 7 is a sectional view of drawn portion 22 and electrode member 30 in inductor 100 taken along line VII-VII in FIG. 4.

As illustrated in FIG. 7, drawn portion 22 includes outer peripheral surface 23 that includes coated region 23*a* having insulating coating 24 and exposed region 23*b* where the conductive wire is exposed without insulating coating 24. Exposed region 23*b* is located at least outward from axis a2 of drawn portion 22 when viewed in the direction perpendicular to side surface 13*c*. That is, the whole or most of exposed region 23*b* is located on the side where first protruding plate portion 36 is located. For example, the length of exposed region 23*b* on the outer periphery of drawn portion 22 is 30% or more and 70% or less of the length of the outer periphery of drawn portion 22. The length of exposed region 23*b* is desirably longer than the length of coated region 23*a*.

Edge E1 of first protruding plate portion 36 is in contact with exposed region 23*b*. Connection portion 40 is formed in the part where exposed region 23*b* and edge E1 of first protruding plate portion 36 are in contact with each other.

As illustrated in FIGS. 1 and 3, connection portion 40 includes first connection portion 41 in which drawn portion 22 and edge E1 of first protruding plate portion 36 are welded together. First connection portion 41 is formed in the extending direction of drawn portion 22. For example, first connection portion 41 is composed of a plurality of weld marks ws formed by laser seam welding, and the plurality of weld marks ws are connected in the extending direction of drawn portion 22. All or some of the plurality of weld marks ws may be connected continuously.

For example, the length of first connection portion 41 in the extending direction of drawn portion 22 is 1.5 times or more and 5 times or less the diameter of drawn portion 22. Moreover, $L1 \geq (S \times 0.2)/t1$, where L1 is the length of first connection portion 41 in the extending direction, t1 is the thickness of first protruding plate portion 36, and S is the cross-sectional area of drawn portion 22 (region hatched diagonally right up). In the formula, $L1 \times t1$ corresponds to the cross-sectional area of the weld zone. Therefore, the cross-sectional area of the weld zone is larger when length L1 of first connection portion 41 is longer.

In this embodiment, edge E1 of first protruding plate portion 36 is in contact with drawn portion 22 in the extending direction of drawn portion 22. It is therefore possible to increase the length of connection portion 40 formed by welding edge E1 and drawn portion 22. Consequently, the cross-sectional area of connection portion 40 that connects coil element 20 and electrode member 30 can be increased to thus enhance the connection reliability. Since the cross-sectional area of the current path in connection portion 40 can be increased, the DC resistance can be decreased, so that the reliability of the inductor can be enhanced. Moreover, since the cross-sectional area of the current path in connection portion 40 can be increased, the temperature rise when the inductor is energized can be prevented, so that the reliability of the inductor can be enhanced.

[Manufacturing Method]

Figure 8:
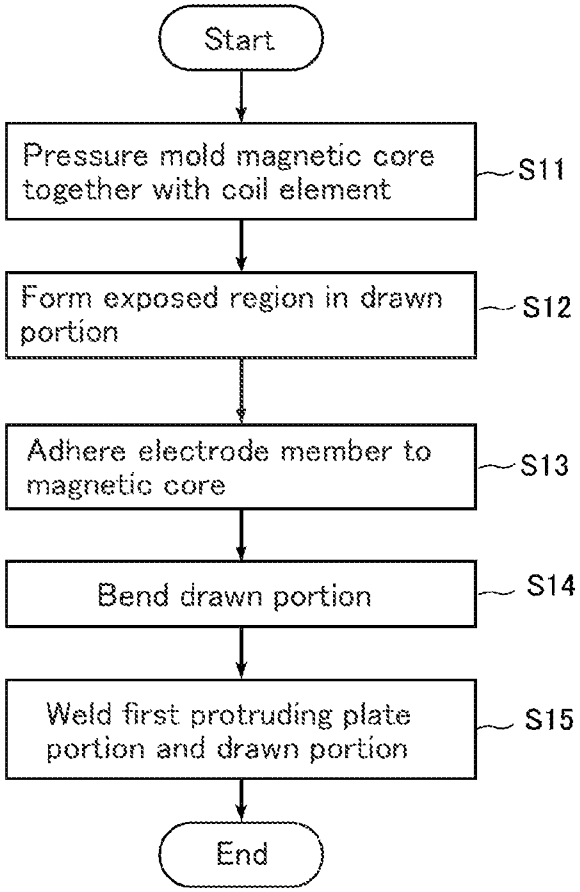
FIG. 8 is a flowchart illustrating a method of manufacturing the inductor according to the embodiment.

A method of manufacturing inductor 100 described above will be described below. FIG. 8 is a flowchart illustrating a method of manufacturing inductor 100 according to the embodiment. The manufacturing method described below is an example, and the manufacturing method for inductor 100 is not limited to such. The following description mainly focuses on half of inductor 100 on the positive side of the X-axis. The same method can be used for half of inductor 100 on the negative side of the X-axis, and the same description applies.

In the method of manufacturing inductor 100, first, a process of pressure molding magnetic core 10 together with coil element 20 is performed (Step S11). The process in Step S11 is executed by placing coil element 20 including coil portion 21 in a mold and pressure molding a dust core. For example, the pressure applied during pressure molding is 5 ton/cm$^2$, and the thermal curing temperature is 185° C. After the pressure molding, drawn portion 22 exposed without being covered with magnetic core 10 protrudes perpendicularly to side surface 13*c* of magnetic core 10, for example.

Next, a process of forming exposed region 23*b* on outer peripheral surface 23 of drawn portion 22 is performed (Step S12). Exposed region 23*b* is formed by removing part of insulating coating 24 by laser irradiation or the like after Step S11.

Next, a process of adhering electrode member 30, which has been formed by cutting and bending a metal material plate in advance, to magnetic core 10 using an adhesive is performed (Step S13). Here, electrode member 30 and magnetic core 10 are arranged in the positional relationship illustrated in FIG. 1, and bottom plate portion 31 and bottom surface 11 are adhered to each other. In Step S13, the adhesive is cured by heating or the like according to need.

Next, a process of bending drawn portion 22 exposed from magnetic core 10 so as to extend along side surface 13*c* is performed (Step S14). Specifically, drawn portion 22 is bent from its base located on side surface 13*c* so as to cover side plate portion 35 of electrode member 30, and is shaped to extend in the direction connecting bottom surface 11 and top surface 12. This brings drawn portion 22 and edge E1 of first protruding plate portion 36 into contact with each other.

Next, a process of welding edge E1 of first protruding plate portion 36 and drawn portion 22 by laser seam welding or the like is performed (Step S15). Thus, first connection portion 41 is formed in the extending direction of drawn portion 22. Weld marks ws formed in first connection portion 41 are circular, and are formed, for example, by rotating the spot of the laser beam with a predetermined radius.

Through the foregoing Steps S11 to S15, inductor 100 in which coil element 20 and electrode member 30 are connected by connection portion 40 is manufactured.

[Effects, Etc.]

As described above, inductor 100 according to this embodiment includes: magnetic core 10 containing a magnetic material and including bottom surface 11, top surface 12, and side surface 13*c* connected to bottom surface 11 and top surface 12; coil element 20 including coil portion 21 buried in magnetic core 10 and drawn portion 22 connected to an end (for example, 21*a*) of coil portion 21 and drawn from side surface 13*c* to outside of magnetic core 10; electrode member 30 located on side surface 13*c* and bottom surface 11; and connection portion 40 connecting drawn portion 22 and electrode member 30. Electrode member 30 includes bottom plate portion 31 located along bottom surface 11, side plate portion 35 connected to bottom plate portion 31 and located along side surface 13*c*, and first protruding plate portion 36 connected to side plate portion 35 and protruding in a direction away from side surface 13*c*. Drawn portion 22 extends along side plate portion 35 or side surface 13*c*, on the outside of magnetic core 10. First protruding plate portion 36 includes edge E1 at least part of which is in contact with drawn portion 22 in an extending direction of drawn portion 22. Connection portion includes first connection portion 41 in which drawn portion 22 and edge E1 of first protruding plate portion 36 are welded together.

In inductor 100 according to this embodiment, edge E1 of first protruding plate portion 36 is in contact with drawn portion 22 in the extending direction of drawn portion 22. It is therefore possible to increase the length of first connection portion 41 formed by welding edge E1 and drawn portion 22. Consequently, the cross-sectional area of connection portion 40 that connects coil element 20 and electrode member 30 can be increased to thus enhance the connection reliability. Since the cross-sectional area of the current path in connection portion 40 can be increased, the DC resistance can be decreased, so that the reliability of the inductor can be enhanced. Moreover, since the cross-sectional area of the current path in connection portion 40 can be increased, the temperature rise when the inductor is energized can be prevented, so that the reliability of the inductor can be enhanced.

Moreover, first connection portion 41 may be formed in the extending direction of drawn portion 22.

With this structure, it is possible to increase the length of first connection portion 41 formed in the extending direction of drawn portion 22. Consequently, the cross-sectional area of connection portion 40 that connects coil element 20 and electrode member 30 can be increased to thus enhance the connection reliability. Since the cross-sectional area of the current path in connection portion 40 can be increased, the DC resistance can be decreased, so that the reliability of the inductor can be enhanced. Moreover, since the cross-sectional area of the current path in connection portion 40 can be increased, the temperature rise when the inductor is energized can be prevented, so that the reliability of the inductor can be enhanced.

Moreover, first connection portion 41 may be formed by a plurality of weld marks ws connected to each other.

With this structure, the length of first connection portion 41 can be increased, so that the cross-sectional area of connection portion 40 can be increased. The reliability of inductor 100 can thus be enhanced.

Moreover, drawn portion 22 may include outer peripheral surface 23 that includes coated region 23*a* having insulating coating 24 and exposed region 23*b* not having insulating coating 24, and connection portion 40 may be formed in exposed region 23*b*.

With this structure, the reliability of the connection between drawn portion 22 and electrode member 30 in connection portion 40 can be enhanced. The reliability of inductor 100 can thus be enhanced.

Moreover, in a sectional view of drawn portion 22, a length of exposed region 23*b* on an outer periphery of drawn portion 22 may be 30% or more and 70% or less of a length of the outer periphery of drawn portion 22.

With this structure, exposed region 23*b* can be formed more easily than in the case where the entire outer periphery of drawn portion 22 is exposed region 23*b*. For example, in the case of removing insulating coating 24 of drawn portion 22 by laser irradiation, exposed region 23*b* can be easily formed by applying a laser from one direction to remove insulating coating 24.

Moreover, $L1 \geq (S \times 0.2)/t1$, where L1 is a length of first connection portion 41 in the extending direction of drawn portion 22, t1 is a thickness of first protruding plate portion 36, and S is a cross-sectional area of drawn portion 22.

With this structure, a sufficient length of first connection portion 41 can be ensured. The reliability of inductor 100 can thus be enhanced.

Moreover, drawn portion 22 may extend in a direction connecting bottom surface 11 and top surface 12.

With this structure, a sufficient length of first connection portion 41 can be ensured. The reliability of inductor 100 can thus be enhanced.

Variations of Embodiment

An inductor according to each variation of the embodiment will be described below. The following description of each variation mainly focuses on the differences from the embodiment, and the description of common parts is omitted or simplified.

[Variation 1]

Inductor 100A according to Variation 1 of the embodiment will be described below. Variation 1 describes an example in which inductor 100A further includes second connection portion 42 and the like in addition to first connection portion 41.

Figure 9:
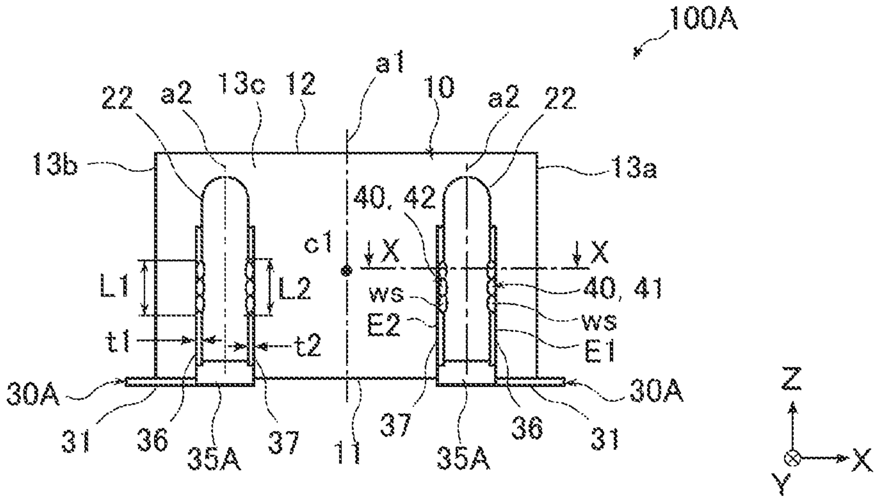
FIG. 9 is a side view of an inductor according to Variation 1 of the embodiment.
Figure 10:
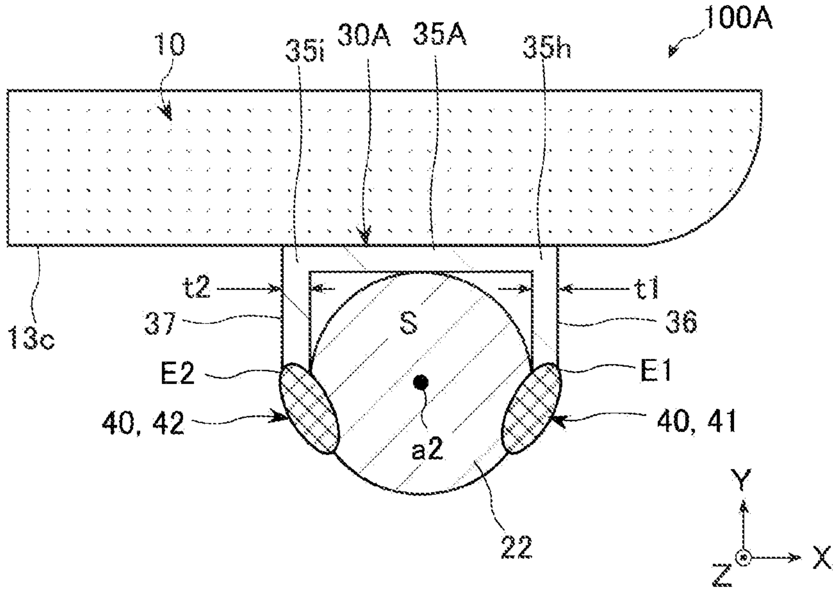
FIG. 10 is a sectional view of a drawn portion and an electrode member in the inductor according to Variation 1 of the embodiment, taken along line X-X in FIG. 9.

FIG. 9 is a side view of an inductor according to Variation 1 of the embodiment. FIG. 10 is a sectional view of drawn portion 22 and electrode member 30A in inductor 100A according to Variation 1, taken along line X-X in FIG. 9.

Inductor 100A according to Variation 1 includes magnetic core 10, coil element 20 including coil portion 21 and drawn portion 22, electrode member 30A as an external terminal, and connection portion 40 connecting drawn portion 22 and electrode member 30A. The structures of magnetic core 10 and coil element 20 are substantially the same as those in the embodiment. In Variation 1, outer peripheral surface 23 of drawn portion 22 is not coated with insulating coating 24 and is exposed region 23*b*.

Electrode member 30A includes bottom plate portion 31, side plate portion 35A, and first protruding plate portion 36, and further includes second protruding plate portion 37. Bottom plate portion 31 and first protruding plate portion 36 are the same as those in the embodiment. Side plate portion 35A is shorter in the X-axis direction than in the embodiment.

Second protruding plate portion 37 is connected to inner end 35*i* of side plate portion 35A, and protrudes in a direction away from side surface 13*c* of magnetic core 10. Second protruding plate portion 37 protrudes perpendicularly to side plate portion 35A, and faces first protruding plate portion 36 with drawn portion 22 therebetween. In other words, first protruding plate portion 36 and second protruding plate portion 37 protrude from both ends of side plate portion 35A and face each other when viewed in the direction perpendicular to side surface 13*c*. Drawn portion 22 is located between first protruding plate portion 36 and second protruding plate portion 37, and is sandwiched between first protruding plate portion 36 and second protruding plate portion 37.

Second protruding plate portion 37 includes edge E2 on the side opposite to side surface 13*c* and inner end 35*i*. At least part of edge E2 is in contact with drawn portion 22 in the extending direction of drawn portion 22. Edge E2 is in contact with drawn portion 22 on the side of drawn portion 22 opposite to edge E1.

Connection portion 40 includes first connection portion 41 in which drawn portion 22 and edge E1 are welded together, and second connection portion 42 in which drawn portion 22 and edge E2 are welded together.

Second connection portion 42 in Variation 1 is also composed of a plurality of weld marks ws formed by laser seam welding, and the plurality of weld marks ws are connected in the extending direction of drawn portion 22. That is, second connection portion 42 is formed in the extending direction of drawn portion 22. For example, the length of second connection portion 42 is 1.5 times or more and 5 times or less the diameter of drawn portion 22.

In Variation 1, connection portion 40 is composed of two connection parts, i.e. first connection portion 41 and second connection portion 42. Hence, the length of connection portion 40, which is the sum of the lengths of first connection portion 41 and second connection portion 42, can be increased.

Meanwhile, since there are two connection parts in Variation 1, the length of each of first connection portion 41 and second connection portion 42 in the extending direction can be made shorter than that in the embodiment. Accordingly, Variation 1 may have such a structure that $L1 \geq (S \times 0.1)/t1$, where L1 is the length of first connection portion 41 in the extending direction, t1 is the thickness of first protruding plate portion 36, and S is the cross-sectional area of drawn portion 22, and $L2 \geq (S \times 0.1)/t2$, where L2 is the length of second connection portion 42 in the extending direction, and t2 is the thickness of second protruding plate portion 37. In the formula, the sum of $L1 \times t1$ and $L2 \times t2$ corresponds to the cross-sectional area of the weld zone.

In inductor 100A according to Variation 1, too, edge E1 of first protruding plate portion 36 is in contact with drawn portion 22 in the extending direction of drawn portion 22. It is therefore possible to increase the length of connection portion 40 formed by welding edge E1 and drawn portion 22.

In inductor 100A according to Variation 1, electrode member further includes second protruding plate portion 37 that faces first protruding plate portion 36 with drawn portion 22 therebetween, is connected to side plate portion 35A, and protrudes in a direction away from side surface 13*c*. Second protruding plate portion 37 includes edge E2 at least part of which is in contact with drawn portion 22 in an extending direction of drawn portion 22.

In inductor 100A according to Variation 1, edge E2 of second protruding plate portion 37 is in contact with drawn portion 22 in the extending direction of drawn portion 22. It is therefore possible to increase the length of the connection part formed by welding edge E2 and drawn portion 22. The reliability of inductor 100A can thus be enhanced.

Moreover, connection portion 40 may further include second connection portion 42 in which drawn portion 22 and edge E2 of second protruding plate portion 37 are welded together.

With this structure, connection portion 40 is composed of two connection parts, i.e. first connection portion 41 and second connection portion 42. Hence, the length of connection portion 40, which is the sum of the lengths of first connection portion 41 and second connection portion 42, can be increased. This can increase the cross-sectional area of connection portion 40, so that the reliability of inductor 100A can be enhanced.

Moreover, inductor 100A may have such a structure that $L1 \geq (S \times 0.1)/t1$, where L1 is a length of first connection portion 41 in the extending direction of drawn portion 22, t1 is a thickness of first protruding plate portion 36, and S is a cross-sectional area of drawn portion 22, and $L2 \geq (S \times 0.1)/t2$, where L2 is a length of second connection portion 42 in the extending direction of drawn portion 22, and t2 is a thickness of second protruding plate portion 37.

As a result of inductor 100A including two connection parts in this way, the length of each of first connection portion 41 and second connection portion 42 in the extending direction of drawn portion 22 can be prevented from being longer than necessary. Such inductor 100A can be reduced in size or height.

Moreover, side plate portion 35A may be located between side surface 13*c* and drawn portion 22, and first protruding plate portion 36 and second protruding plate portion 37 may protrude from respective both ends of side plate portion 35A when viewed in a direction perpendicular to side surface 13*c*.

With this structure, drawn portion 22 can be sandwiched between first protruding plate portion 36 and second protruding plate portion 37, with it being possible to improve the mechanical strength of inductor 100A. The reliability of inductor 100A can thus be enhanced.

[Variation 2]

Inductor 100B according to Variation 2 of the embodiment will be described below. Variation 2 describes an example in which inductor 100B further includes second connection portion 42 and the like in addition to first connection portion 41, as in Variation 1.

Figure 11:
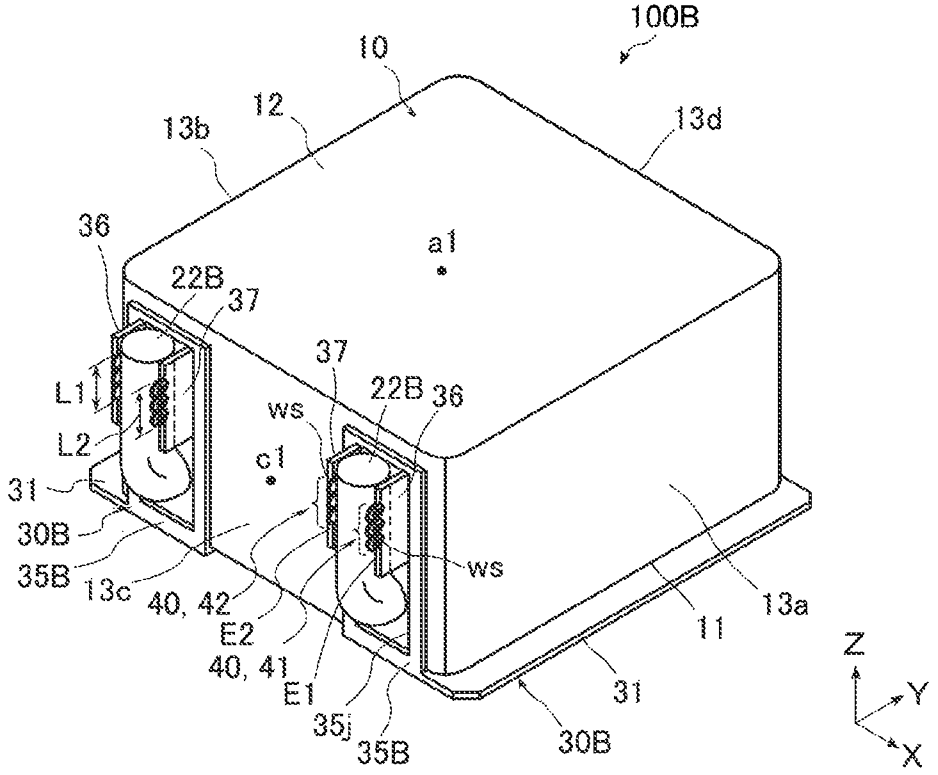
FIG. 11 is a perspective view of an inductor according to Variation 2 of the embodiment.
Figure 12:
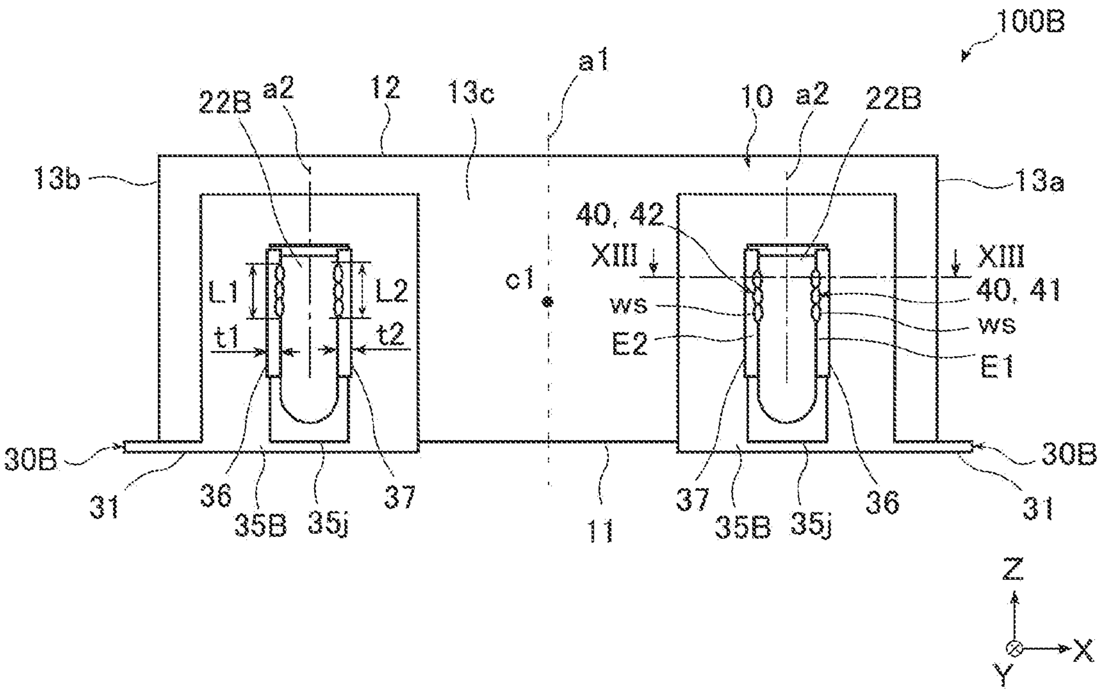
FIG. 12 is a side view of the inductor according to Variation 2 of the embodiment.
Figure 13:
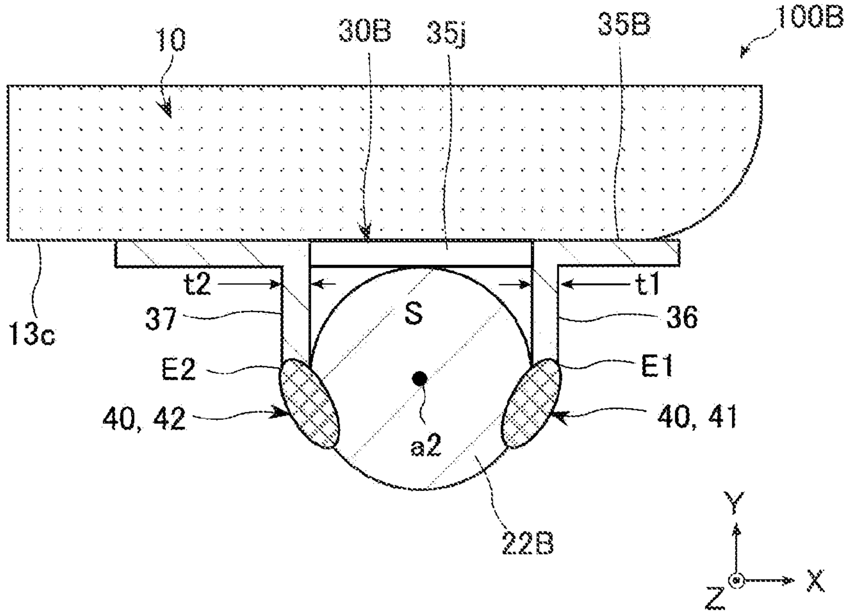
FIG. 13 is a sectional view of a drawn portion and an electrode member in the inductor according to Variation 2 of the embodiment, taken along line XIII-XIII in FIG. 12.

FIG. 11 is a perspective view of inductor 100B according to Variation 2 of the embodiment. FIG. 12 is a side view of inductor 100B according to Variation 2 of the embodiment. FIG. 13 is a sectional view of drawn portion 22B and electrode member 30B in inductor 100B according to Variation 2, taken along line XIII-XIII in FIG. 12.

Inductor 100B according to Variation 2 includes magnetic core 10, coil element 20 including coil portion 21 and drawn portion 22B, electrode member 30B as an external terminal, and connection portion 40 connecting drawn portion 22B and electrode member 30B. The structure of magnetic core 10 is substantially the same as that in the embodiment.

Coil portion 21 in Variation 2 includes both ends that connect the wound part to side surface 13*c* of magnetic core 10. Both ends of coil portion 21 are located at a height closer to bottom surface 11 than center c1 of side surface 13*c* when viewed in the direction perpendicular to side surface 13*c*.

Each drawn portion 22B is connected to the corresponding end of coil portion 21, is drawn from side surface 13*c* of magnetic core 10 to the outside, and extends along side surface 13*c*. Specifically, drawn portion 22B is drawn to the outside from a height closer to bottom surface 11 than center c1 of side surface 13*c*, is bent along side surface 13*c*, and extends in the direction connecting bottom surface 11 and top surface 12 to a point before reaching the edge of top surface 12. Outer peripheral surface 23 of drawn portion 22B is not coated with insulating coating 24 and is exposed region 23*b* (not illustrated).

Electrode member 30B in Variation 2 includes bottom plate portion 31, side plate portion 35B, first protruding plate portion 36, and second protruding plate portion 37.

Side plate portion 35B has opening 35*j* in the extending direction of drawn portion 22B. The length of opening 35*j* in the extending direction is longer than the length of drawn portion 22B, and the width of opening 35*j* is the same as the diameter of drawn portion 22B. Opening 35*j* may be a rectangular through hole or a slit.

First protruding plate portion 36 and second protruding plate portion 37 are connected to regions on both outer sides of opening 35*j* of side plate portion 35B when viewed in the direction perpendicular to side surface 13*c*, and protrude in a direction away from side surface 13*c* of magnetic core 10. First protruding plate portion 36 and second protruding plate portion 37 protrude perpendicularly to side plate portion 35B, and face each other with drawn portion 22B therebetween. In other words, drawn portion 22B is located between first protruding plate portion 36 and second protruding plate portion 37, and is sandwiched between first protruding plate portion 36 and second protruding plate portion 37.

First protruding plate portion 36 includes edge E1 on the side opposite to side surface 13*c*. At least part of edge E1 is in contact with drawn portion 22B in the extending direction of drawn portion 22B. Second protruding plate portion 37 includes edge E2 on the side opposite to side surface 13*c*. At least part of edge E2 is in contact with drawn portion 22B in the extending direction of drawn portion 22B. Edges E1 and E2 are in contact with drawn portion 22B on the opposite sides of drawn portion 22B.

Connection portion 40 includes first connection portion 41 in which drawn portion 22B and edge E1 are welded together, and second connection portion 42 in which drawn portion 22B and edge E2 are welded together. For example, the length of each of first connection portion 41 and second connection portion 42 is 1.5 times or more and 5 times or less the diameter of drawn portion 22B.

In Variation 2, too, connection portion 40 is composed of two connection parts, i.e. first connection portion 41 and second connection portion 42. Hence, the length of connection portion 40, which is the sum of the lengths of first connection portion 41 and second connection portion 42, can be increased.

Meanwhile, since there are two connection parts in Variation 2, the length of each of first connection portion 41 and second connection portion 42 in the extending direction of drawn portion 22B can be made shorter than that in the embodiment. Accordingly, Variation 2 has such a structure that $L1 \geq (S \times 0.1)/t1$, where L1 is the length of first connection portion 41 in the extending direction, t1 is the thickness of first protruding plate portion 36, and S is the cross-sectional area of drawn portion 22B, and $L2 \geq (S \times 0.1)/t2$, where L2 is the length of second connection portion 42 in the extending direction, and t2 is the thickness of second protruding plate portion 37. In the formula, the sum of L1×t1 and L2×t2 corresponds to the cross-sectional area of the weld zone.

Inductor 100B according to Variation 2 has the same effects as inductor 100A according to Variation 1.

In inductor 100B according to Variation 2, side plate portion 35B has opening 35*j* in the extending direction of drawn portion 22B, and first protruding plate portion 36 and second protruding plate portion 37 protrude from respective regions located on both outer sides of opening 35*j* of side plate portion 35B when viewed in the direction perpendicular to side surface 13*c*.

With this structure, drawn portion 22B can be sandwiched between first protruding plate portion 36 and second protruding plate portion 37, with it being possible to improve the mechanical strength of inductor 100B. The reliability of inductor 100B can thus be enhanced.

[Variation 3]

Inductor 100C according to Variation 3 of the embodiment will be described below. Variation 3 describes an example in which drawn portion 22C extends in a direction intersecting the direction connecting bottom surface 11 and top surface 12 of magnetic core 10, and connection portion 40C is formed in the extending direction of drawn portion 22C.

Figure 14:
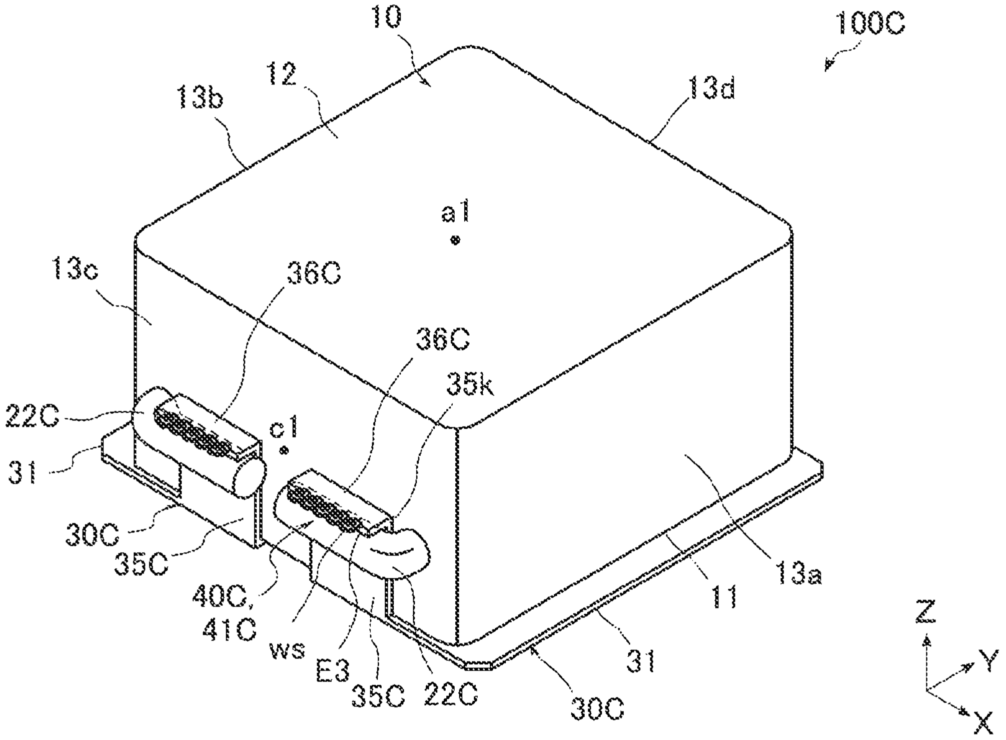
FIG. 14 is a perspective view of an inductor according to Variation 3 of the embodiment.

FIG. 14 is a perspective view of inductor 100C according to Variation 3 of the embodiment.

Inductor 100C according to Variation 3 includes magnetic core 10, coil element 20 including coil portion 21 and drawn portion 22C, electrode member 30C as an external terminal, and connection portion 40C connecting drawn portion 22C and electrode member 30C. Magnetic core 10 is the same as that in the embodiment.

Coil portion 21 in Variation 3 includes both ends that connect the wound part to side surface 13*c* of magnetic core 10. One end of coil portion 21 is located closer to side surface 13*a* than winding axis a1 and the other end is located closer to side surface 13*b* than winding axis a1, when viewed in the direction perpendicular to side surface 13*c*.

The following description mainly focuses on half of inductor 100C on the positive side of the X-axis. Half of inductor 100C on the negative side of the X-axis has the same structure as half of inductor 100C on the positive side of the X-axis, and the same description applies.

Each drawn portion 22C is connected to the corresponding end of coil portion 21, is drawn from side surface 13*c* of magnetic core 10 to the outside, and extends along side plate portion 35C. Specifically, drawn portion 22C is drawn to the outside from side surface 13*c*, is bent so as to cover side plate portion 35C of electrode member 30C, and extends in a direction (X-axis direction) intersecting the direction connecting bottom surface 11 and top surface 12 to a point before reaching the center of side surface 13*c*. Drawn portion 22C in Variation 3 is drawn out from one side surface 13*c* out of the four side surfaces, too.

Electrode member 30C is located on the outside of magnetic core 10, and is electrically connected to drawn portion 22C via connection portion 40C. Electrode member 30C includes bottom plate portion 31 located on the bottom surface 11 side of magnetic core 10, side plate portion 35C connected to bottom plate portion 31, and first protruding plate portion 36C connected to side plate portion 35. Bottom plate portion 31 is the same as that in the embodiment.

Side plate portion 35C is connected to bottom plate portion 31, and located along side surface 13*c* of magnetic core 10. Side plate portion 35C is located between side surface 13*c* of magnetic core 10 and drawn portion 22C. Side plate portion 35C includes top surface-side end 35*k* located closer to top surface 12 than drawn portion 22C, when viewed in the direction perpendicular to side surface 13*c*. Side plate portion 35C in this variation is provided in correspondence with only one side surface 13*c* out of the four side surfaces.

First protruding plate portion 36C is connected to top surface-side end 35*k* of side plate portion 35C, and protrudes in a direction away from side surface 13*c* of magnetic core 10. First protruding plate portion 36C protrudes perpendicularly to side plate portion 35C. First protruding plate portion 36C includes edge E3 on the side opposite to side surface 13*c* and top surface-side end 35*k*. At least part of edge E3 is in contact with drawn portion 22C in the extending direction of drawn portion 22C (X-axis direction).

Drawn portion 22C includes outer peripheral surface 23 that includes coated region 23*a* having insulating coating 24 and exposed region 23*b* having no insulating coating 24. Exposed region 23*b* is located at least on the top surface 12 side of axis a2 of drawn portion 22C when viewed in the direction perpendicular to side surface 13*c*. That is, exposed region 23*b* is located on the side where first protruding plate portion 36C is located.

Edge E3 of first protruding plate portion 36C is in contact with exposed region 23*b*. Connection portion 40C is formed in the part where exposed region 23*b* and edge E3 of first protruding plate portion 36C are in contact with each other.

Connection portion 40C includes first connection portion 41C in which drawn portion 22C and edge E3 of first protruding plate portion 36C are welded together. First connection portion 41C is formed in the extending direction of drawn portion 22C. For example, first connection portion 41C is composed of a plurality of weld marks ws formed by laser seam welding, and the plurality of weld marks ws are connected in the extending direction of drawn portion 22C. For example, the length of first connection portion 41C in the extending direction of drawn portion 22C is 1.5 times or more and 5 times or less the diameter of drawn portion 22C.

Inductor 100C according to Variation 3 has the same effects as inductor 100 according to the embodiment.

In inductor 100C according to Variation 3, drawn portion 22C extends in a direction intersecting the direction connecting bottom surface 11 and top surface 12.

With this structure, a sufficient length of first connection portion 41C can be ensured. The reliability of inductor 100C can thus be enhanced.

[Variation 4]

Inductor 100D according to Variation 4 of the embodiment will be described below. Variation 4 describes an example in which drawn portion 22D is composed of first drawn portion 22*d*1 and second drawn portion 22*d*2 and each of first drawn portion 22*d*1 and second drawn portion 22*d*2 extends in a direction intersecting the direction connecting bottom surface 11 and top surface 12 of magnetic core 10.

Figure 15:
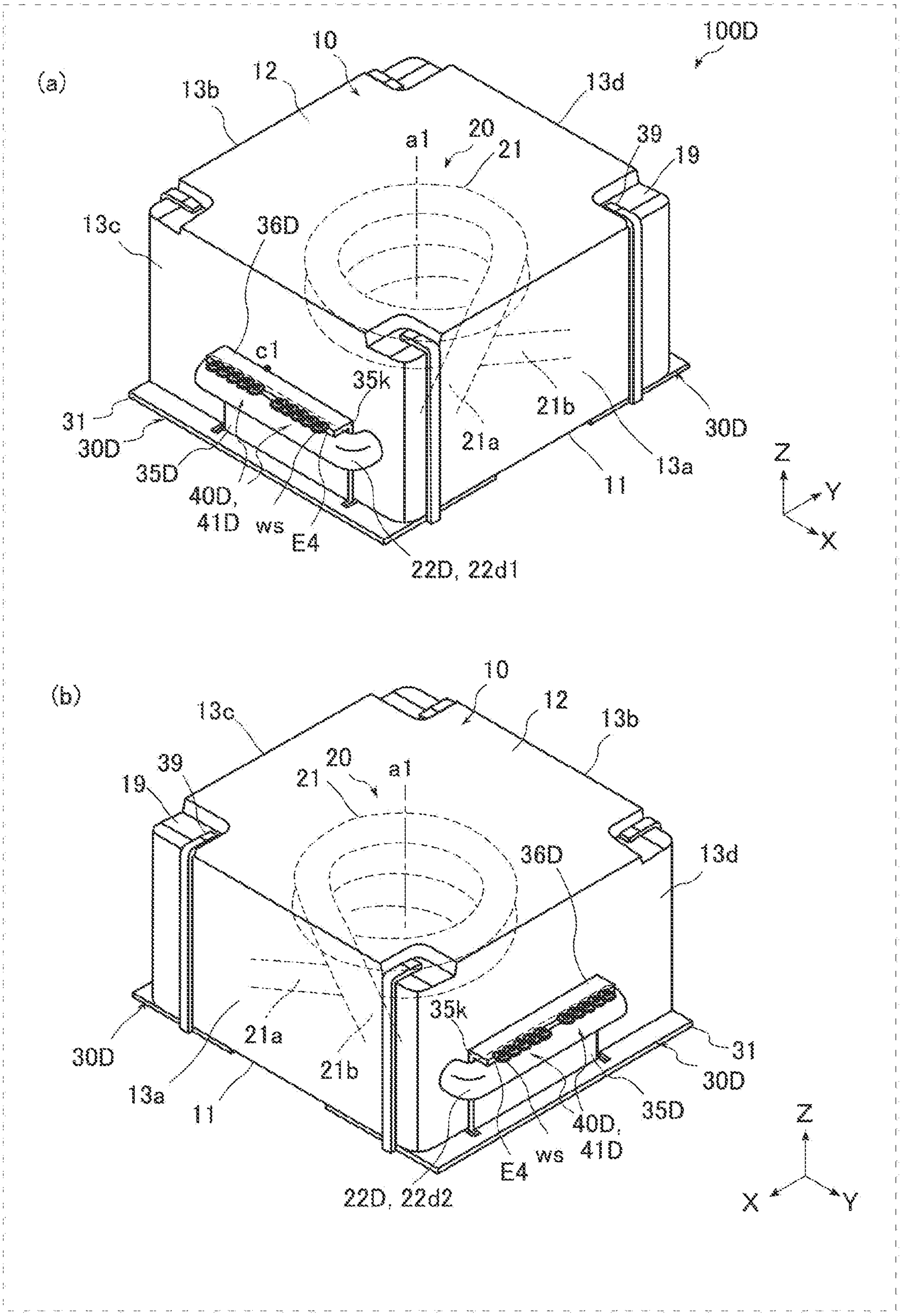
FIG. 15 is a perspective view of an inductor according to Variation 4 of the embodiment.

FIG. 15 is a perspective view of inductor 100D according to Variation 4 of the embodiment. (a) in FIG. 15 is a perspective view of inductor 100D as viewed from a predetermined direction, and (b) in FIG. 15 is a perspective view of inductor 100D as viewed from a direction different from the predetermined direction.

Inductor 100D according to Variation 4 includes magnetic core 10, coil element 20 including coil portion 21 and drawn portion 22D, electrode member 30D as an external terminal, and connection portion 40D connecting drawn portion 22D and electrode member 30D.

Magnetic core 10 is, for example, a rectangular parallelepiped. Magnetic core 10 includes bottom surface 11, top surface 12 opposite to bottom surface 11, and four side surfaces 13*a*, 13*b*, 13*c*, and 13*d* connected to bottom surface 11 and top surface 12. In this variation, side surface 13*c* is called first side surface 13*c*, and side surface 13*d* is called second side surface 13*d*.

Coil portion 21 includes one end 21*a* that connects the wound part to first side surface 13*c* of magnetic core 10, and other end 21*b* that connects the wound part to second side surface 13*d*. One end 21*a* of coil portion 21 is located closer to side surface 13*a* than winding axis a1, when viewed in the direction perpendicular to first side surface 13*c*. Other end 21*b* of coil portion 21 is located closer to side surface 13*a* than winding axis a1, when viewed in the direction perpendicular to second side surface 13*d*.

Drawn portion 22D is composed of first drawn portion 22*d*1 and second drawn portion 22*d*2.

Electrode member 30D is composed of one electrode member 30D and other electrode member 30D. One electrode member 30D includes one bottom plate portion 31 located on the bottom surface 11 side of magnetic core 10, one side plate portion 35D connected to one bottom plate portion 31 and located on first side surface 13*c* side, and one first protruding plate portion 36D connected to one side plate portion 35D. Other electrode member 30D includes other bottom plate portion 31 located on the bottom surface 11 side of magnetic core 10, other side plate portion 35D connected to other bottom plate portion 31 and located on second side surface 13*d*, and other first protruding plate portion 36D connected to other side plate portion 35D.

In Variation 4, first drawn portion 22*d*1 is connected to one end 21*a* of coil portion 21, is drawn from first side surface 13*c* of magnetic core 10 to the outside, and extends along one side plate portion 35D. Specifically, first drawn portion 22*d*1 is drawn to the outside from a position closer to side surface 13*a* than winding axis a1 when viewed in the direction perpendicular to first side surface 13*c*, is bent so as to cover side plate portion 35D, and extends in a direction (X-axis direction) intersecting the direction connecting bottom surface 11 and top surface 12 to a point before reaching the edge of side surface 13*b*.

Second drawn portion 22*d*2 is connected to other end 21*b* of coil portion 21, is drawn from second side surface 13*d* of magnetic core 10 to the outside, and extends along other side plate portion 35D. Specifically, second drawn portion 22*d*2 is drawn to the outside from a position closer to side surface 13*a* than winding axis a1 when viewed in the direction perpendicular to second side surface 13*d*, is bent so as to cover other side plate portion 35D, and extends in a direction (X-axis direction) intersecting the direction connecting bottom surface 11 and top surface 12 to a point before reaching the edge of side surface 13*b*.

One electrode member 30D is electrically connected to first drawn portion 22*d*1 via one connection portion 40D. Other electrode member 30D is electrically connected to second drawn portion 22*d*2 via other connection portion 40D.

The following description mainly focuses on half of inductor 100D on the negative side of the Y-axis. Half of inductor 100D on the positive side of the Y-axis has the same structure as half of inductor 100D on the negative side of the Y-axis, and the same description applies.

As illustrated in (a) in FIG. 15, one side plate portion 35D is connected to one bottom plate portion 31, and located along first side surface 13*c*. One side plate portion 35D is located between first side surface 13*c* and first drawn portion 22*d*1. One side plate portion 35D includes top surface-side end 35*k* located closer to top surface 12 than first drawn portion 22*d*1 when viewed in the direction perpendicular to first side surface 13*c*.

One first protruding plate portion 36D is connected to top surface-side end 35*k* of one side plate portion 35D, and protrudes in a direction away from first side surface 13*c*. One first protruding plate portion 36D protrudes perpendicularly to one side plate portion 35D. One first protruding plate portion 36D includes edge E4 on the side opposite to first side surface 13*c* and top surface-side end 35*k*. At least part of edge E4 is in contact with first drawn portion 22*d*1 in the extending direction of first drawn portion 22*d*1.

First drawn portion 22*d*1 includes outer peripheral surface 23 that includes coated region 23*a* having insulating coating 24 and exposed region 23*b* having no insulating coating 24. Exposed region 23*b* is located at least on the top surface 12 side of axis a2 of first drawn portion 22*d*1 when viewed in the direction perpendicular to first side surface 13*c*. That is, exposed region 23*b* is located on the side where one first protruding plate portion 36D is located.

Edge E4 of one first protruding plate portion 36D is in contact with exposed region 23*b*. Connection portion 40D is formed in the part where exposed region 23*b* and edge E4 of one first protruding plate portion 36D are in contact with each other.

Connection portion 40D includes first connection portion 41D in which first drawn portion 22*d*1 and edge E4 of first protruding plate portion 36D are welded together. First connection portion 41D is formed in the extending direction of first drawn portion 22*d*1. For example, first connection portion 41D is composed of a plurality of weld marks ws formed by laser seam welding, and the plurality of weld marks ws are connected in the extending direction of first drawn portion 22*d*1. For example, the length of first connection portion 41D is 1.5 times or more and 10 times or less the diameter of first drawn portion 22*d*1.

Connection portion 40D of inductor 100D includes first connection portion 41D in which second drawn portion 22*d*2 and edge E4 of other first protruding plate portion 36D are welded together. The structures of second drawn portion 22*d*2, other first protruding plate portion 36D, and first connection portion 41D are the same as those of the foregoing first connection portion 41D.

Inductor 100D according to Variation 4 has the same effects as inductor 100C according to Variation 3.

In inductor 100D, notch portion 19 is provided on top surface 12 of magnetic core 10, and engaging portion 39 is provided in electrode member 30D. Notch portion 19 is a recess from top surface 12 to the bottom surface 11 side, and is formed at each of the four corners of top surface 12. Engaging portion 39 is a part engaged with notch portion 19 of magnetic core 10, and extends from bottom plate portion 31 toward notch portion 19 of top surface 12 and has its tip bent toward notch portion 19. Two engaging portions 39 are provided for each electrode member 30D, and each engaging portion 39 is engaged with the corresponding notch portion 19. In inductor 100D according to Variation 4, engaging portion 39 is engaged with notch portion 19, as a result of which electrode member 30D is fixed to magnetic core 10 in a state in which magnetic core 10 is sandwiched between bottom plate portion 31 and engaging portion 39.

In inductor 100D according to Variation 4, the side surfaces include first side surface 13*c* and second side surface 13*d* opposite to each other. Drawn portion 22D includes first drawn portion 22*d*1 connected to one end 21*a* of coil portion 21 and second drawn portion 22*d*2 connected to other end 21*b*. First drawn portion 22*d*1 is drawn out from first side surface 13*c* and extends in a direction intersecting the direction connecting bottom surface 11 and top surface 12. Second drawn portion 22*d*2 is drawn out from second side surface 13*d* and extends in a direction intersecting the direction connecting bottom surface 11 and top surface 12.

With this structure, the length of first connection portion 41D can be increased. The reliability of inductor 100D can thus be enhanced.

Moreover, magnetic core 10 may include notch portion 19 on top surface 12, and electrode member 30D may further include engaging portion 39 connected to bottom plate portion 31 and engaged with notch portion 19.

With this structure, electrode member 30D is engaged with magnetic core 10, so that the stress on connection portion 40D is relieved. The reliability of inductor 100D can thus be enhanced.

Other Embodiments, Etc

While the inductors, etc. according to the embodiment and variations of the present disclosure have been described above, the present disclosure is not limited to these embodiment and variations. Other modifications obtained by applying various changes conceivable by a person skilled in the art to the embodiment and variations and any combinations of the elements in different embodiment and variations without departing from the scope of the present disclosure are also included in the scope of the present disclosure.

Although the foregoing embodiment describes an example in which bottom plate portion 31, side plate portion 35, and first protruding plate portion 36 of electrode member 30 are formed by working one member made of the same material, the present disclosure is not limited to such. For example, electrode member 30 may be formed by connecting bottom plate portion 31, side plate portion 35, and first protruding plate portion 36 that are separate members.

Although the foregoing embodiment describes an example in which coil portion 21 and drawn portion 22 of coil element 20 are formed by working one member made of the same material, the present disclosure is not limited to such. Coil element 20 may be formed by connecting coil portion 21 and drawn portion 22 that are separate members.

Although the foregoing embodiment describes an example in which the cross section of drawn portion 22 is circular, the present disclosure is not limited to such. At least part of drawn portion 22 may be flattened to facilitate connection with electrode member 30.

For example, an electric product or an electric circuit using the inductor described above is also included in the present disclosure. Examples of the electric product include power supply devices including the above-described inductor and various devices including the power supply devices.

INDUSTRIAL APPLICABILITY

The inductor according to the present disclosure is useful as an inductor used in various devices and equipment.

REFERENCE SIGNS LIST

10 magnetic core
11 bottom surface
12 top surface
13*a*, 13*b*, 13*c*, 13*d* side surface
19 notch portion
20 coil element
21 coil portion
21*a*, 21*b* end
22, 22B, 22C, 22D drawn portion
22*d*1 first drawn portion
22*d*2 second drawn portion
23 outer peripheral surface
23*a* coated region
23*b* exposed region
24 insulating coating
30A, 30B, 30C, 30D electrode member
31 bottom plate portion
35, 35A, 35B, 35C, 35D side plate portion
35*h* outer end
35*i* inner end
35*j* opening
35*k* top surface-side end
36, 36C, 36D first protruding plate portion
37 second protruding plate portion
39 engaging portion
40, 40C, 40D connection portion
41, 41C, 41D first connection portion
42 second connection portion
100, 100A, 100B, 100C, 100D inductor
a1 winding axis of coil portion
a2 axis of drawn portion
c1 center of side surface
E1, E2, E3, E4 edge
L1 length of first connection portion
L2 length of second connection portion
t1 thickness of first protruding plate portion
t2 thickness of second protruding plate portion
S cross-sectional area of drawn portion
ws weld mark

The invention claimed is:

1. An inductor comprising:

a magnetic core containing a magnetic material and including a bottom surface, a top surface, and a side surface connected to the bottom surface and the top surface;

a coil element including a coil portion buried in the magnetic core and a drawn portion connected to an end of the coil portion and drawn from the side surface to outside of the magnetic core;

an electrode member located on the side surface and the bottom surface; and a connection portion connecting the drawn portion and the electrode member, wherein the electrode member includes a bottom plate portion located along the bottom surface, a side plate portion connected to the bottom plate portion and located along the side surface, and a first protruding plate portion connected to the side plate portion and protruding in a direction away from the side surface, the drawn portion extends along the side plate portion or the side surface, on the outside of the magnetic core, the first protruding plate portion includes an edge at least part of which is in contact with the drawn portion in an extending direction of the drawn portion, the connection portion includes a first connection portion in which the drawn portion and the edge of the first protruding plate portion are welded together, a protruding height of the first protruding plate portion from the side plate portion is smaller than an outer diameter of the drawn Portion, and the first protruding plate portion does not overlap the drawn portion when viewed from a direction orthogonal to the side surface.

2. The inductor according to claim 1, wherein the first connection portion is formed in the extending direction of the drawn portion.

3. The inductor according to claim 2, wherein the first connection portion is formed by a plurality of weld marks connected to each other.

4. The inductor according to claim 1, wherein the drawn portion includes an outer peripheral surface that includes a coated region having an insulating coating and an exposed region not having the insulating coating, and the connection portion is formed in the exposed region.

5. The inductor according to claim 4, wherein in a sectional view of the drawn portion, a length of the exposed region on an outer periphery of the drawn portion is 30% or more and 70% or less of a length of the outer periphery of the drawn portion.

6. The inductor according to claim 1, wherein $L1 \geq (S \times 0.2)/t1$, where L1 is a length of the first connection portion in the extending direction of the drawn portion, t1 is a thickness of the first protruding plate portion, and S is a cross-sectional area of the drawn portion.

7. The inductor according to claim 1, wherein the electrode member further includes a second protruding plate portion facing the first protruding plate portion with the drawn portion therebetween, connected to the side plate portion, and protruding in the direction away from the side surface, and the second protruding plate portion includes an edge at least part of which is in contact with the drawn portion in the extending direction of the drawn portion.

8. The inductor according to claim 7, wherein the connection portion further includes a second connection portion in which the drawn portion and the edge of the second protruding plate portion are welded together.

9. The inductor according to claim 8, wherein $L1 \geq (S \times 0.1)/t1$, where L1 is a length of the first connection portion in the extending direction of the drawn portion, t1 is a thickness of the first protruding plate portion, and S is a cross-sectional area of the drawn portion, and $L2 \geq (S \times 0.1)/t2$, where L2 is a length of the second connection portion in the extending direction of the drawn portion, and t2 is a thickness of the second protruding plate portion.

10. The inductor according to claim 7, wherein the side plate portion is located between the side surface and the drawn portion, and the first protruding plate portion and the second protruding plate portion protrude from respective both ends of the side plate portion when viewed in a direction perpendicular to the side surface.

11. The inductor according to claim 7, wherein the side plate portion has an opening in the extending direction of the drawn portion, and the first protruding plate portion and the second protruding plate portion protrude from respective regions located on both outer sides of the opening of the side plate portion when viewed in a direction perpendicular to the side surface.

12. The inductor according to claim 1, wherein the drawn portion extends in a direction connecting the bottom surface and the top surface.

13. The inductor according to claim 1, wherein the drawn portion extends in a direction intersecting a direction connecting the bottom surface and the top surface.

14. The inductor according to claim 13, wherein the side surface includes a first side surface and a second side surface opposite to each other, the drawn portion includes a first drawn portion connected to one end of the coil portion and a second drawn portion connected to an other end of the coil portion, the first drawn portion is drawn from the first side surface, and extends in a direction intersecting the direction connecting the bottom surface and the top surface, and the second drawn portion is drawn from the second side surface, and extends in a direction intersecting the direction connecting the bottom surface and the top surface.

15. The inductor according to claim 1, wherein the magnetic core includes a notch portion on the top surface, and the electrode member further includes an engaging portion connected to the bottom plate portion and engaged with the notch portion.

* * * * *